No. 651,261. Patented June 5, 1900.
H. McLAUGHLIN.
VEHICLE BODY.
(Application filed Nov. 28, 1899.)

(No Model.) 2 Sheets—Sheet 1.

Witnesses. Inventor.
Harry McLaughlin,
By James L. Norris.
Atty.

THE NORRIS PETERS CO., PHOTO-LITHO., WASHINGTON, D. C.

No. 651,261.
H. McLAUGHLIN.
VEHICLE BODY.
(Application filed Nov. 28, 1899.)
(No Model.)
Patented June 5, 1900.
2 Sheets—Sheet 2.
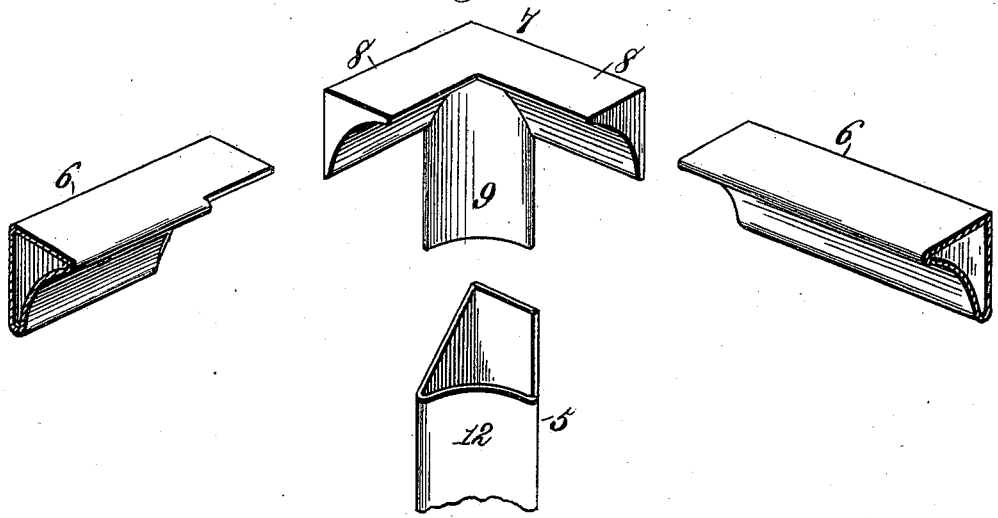
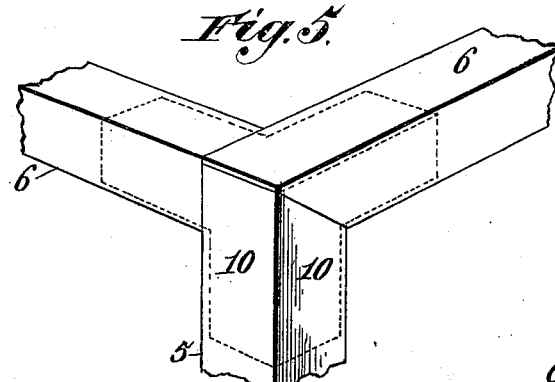
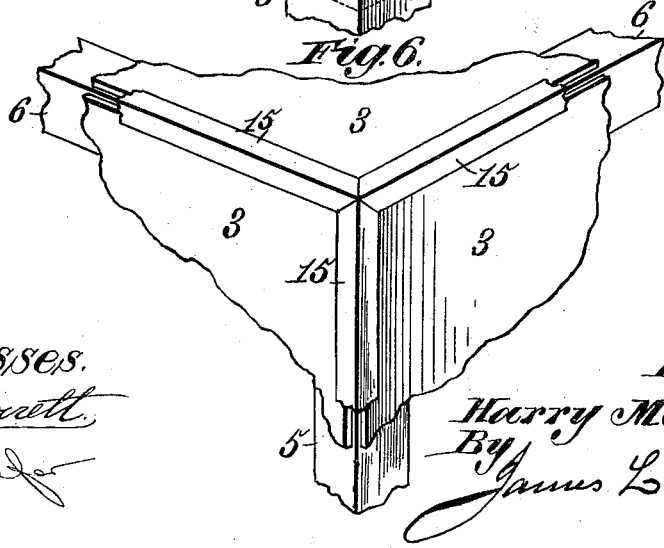
Witnesses.
Robert Everett.
J. B. Keefer.
Inventor.
Harry McLaughlin.
By James L. Norris,
Atty.

UNITED STATES PATENT OFFICE.

HARRY McLAUGHLIN, OF NEW YORK, N. Y.

VEHICLE-BODY.

SPECIFICATION forming part of Letters Patent No. 651,261, dated June 5, 1900.

Application filed November 28, 1899. Serial No. 738,559. (No model.)

*To all whom it may concern:*

Be it known that I, HARRY McLAUGHLIN, a citizen of the United States, residing at New York, (Stapleton, Staten Island,) in the county of Richmond and State of New York, have invented new and useful Improvements in Wheeled Vehicles, of which the following is a specification.

This invention relates particularly to the bodies or frames of automobiles, but is useful for all classes or types of broughams, cabs, or wheeled vehicles or carriages in general.

The chief object of my present invention is to provide novel, simple, effective, and economical means for detachably connecting the adjacent or contiguous edges of the panel-sections composing the body of an automobile or other wheeled vehicle.

The invention also has for its object to provide new and improved means whereby if any panel-section becomes damaged or injured in any manner it can be conveniently and rapidly removed and a new panel-section placed in proper position, thus enabling the highly-finished parts of the vehicle body or frame to be conveniently, quickly, and economically repaired without necessarily requiring skilled workmanship.

The invention also has for its object to provide new and improved means for connecting the adjacent or contiguous edges of the panel-sections of the body of a wheeled vehicle without constructing or providing such panel-sections with holes or orifices for the passage of bolts or screws, as is ordinarily practiced.

To accomplish all these objects, my invention involves the features of construction and the arrangement or combination of parts hereinafter described and claimed, reference being made to the accompanying drawings, in which—

Figure 1:
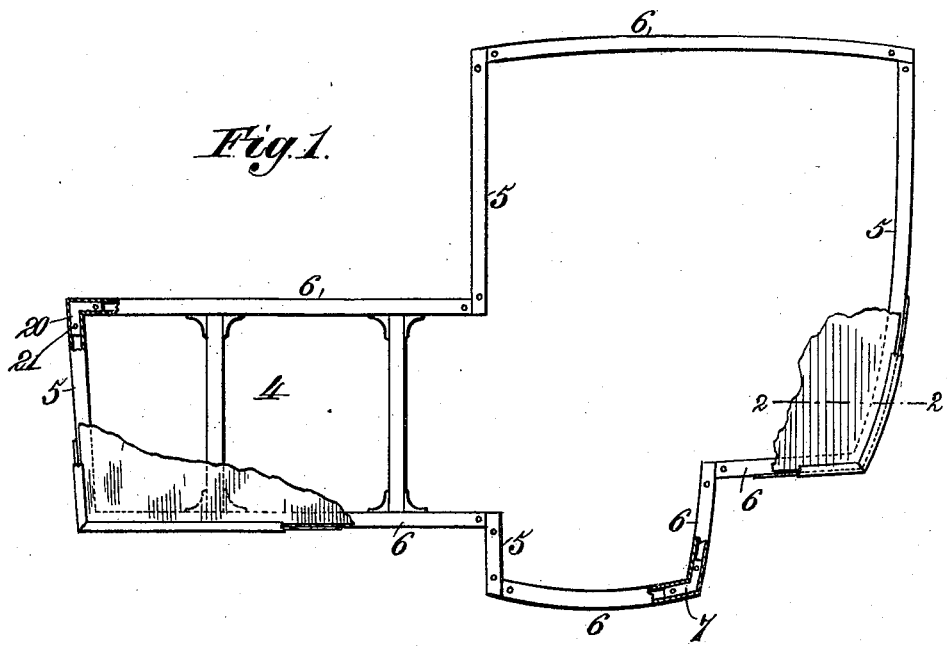
Figures 2, 3:
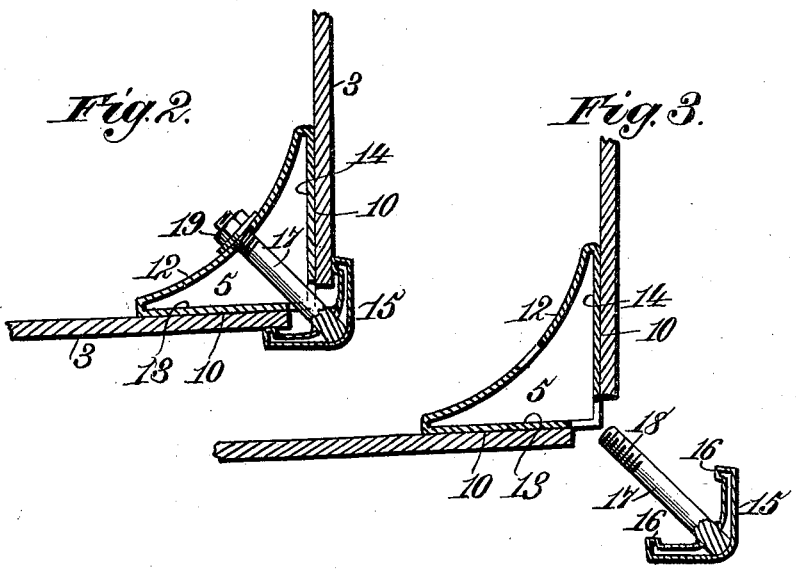

Figure 1 is a sectional side elevation of a portion of the body or frame of an automobile or wheeled vehicle embodying my invention. Fig. 2 is a detail sectional view, on an enlarged scale, taken on the line 2 2, Fig. 1. Fig. 3 is a similar view showing the tubular angle-iron in position and the tubular steel clamping-cap detached. Fig. 4 is a detail perspective view showing portions of one corner of the vehicle body or frame separated from each other. Fig. 5 is a detail perspective view showing the parts represented in Fig. 4 united together preparatory to applying the ornamental panel-sections, and Fig. 6 is a similar view showing portions of the panel-sections clamped in position in accordance with my invention.

In order to enable those skilled in the art to make and use my invention, I will now describe the same in detail, first premising by stating that the vehicle body or frame may be supported by springs in any known or suitable manner and the vehicle-gearing may be of any desired class or type. These parts do not constitute any part of my invention and therefore are not illustrated in the drawings.

The configuration, form, or shape of the body or frame will be such as to meet the conditions required, and the paneling or panel-sections 3 will in practice be enameled, ornamented, or constructed in any style. Ordinarily the panel-sections are of fine material and executed in ornamental designs or with plain polished surfaces, as is well known.

As shown in Fig. 1, the form or shape of the vehicle body or frame is designed for an automobile, and the forwardly-projecting skeleton frame portion 4 may contain the storage batteries; but, as before indicated, the form or shape may be widely varied or be made to suit the conditions required. The skeleton frame comprises vertical tubular angle-irons, members, sections, or standards 5 and horizontal members, sections, or bars 6, united at the corner portions through the medium of T-shaped coupling-brackets 7. (Best seen in Figs. 4 and 5.) The coupling-brackets 7 may be of solid metal or other suitable material and comprise horizontal tenons 8 and pendent tenons 9, fitting, respectively, into the tubular members or sections 6 and 5. The panels 3 may be ornamented or decorated in any desired or suitable manner for the purpose in hand, and the edge portions thereof rest against the flat or substantially-flat surfaces 10 of the tubular angle-irons 5, Figs 2 and 3, which are approximately triangular in cross-section, so that they fit squarely against the inner surface of the panel. The inner wall 12 of each triangular angle-iron is curved, as herein shown, and the walls 13 and 14 are approximately at right angles to one another. The cap-plate 15 is preferably composed of a seamless tube of steel or other metal compressed into right-angular shape in cross-section and having its edges formed with beads 16, adapted to bear against the adjacent edges of the ornamental panels 3. A bolt 17 extends from the tubular cap-plate 15 through the tubular angle-iron 5 and is provided at its inner end with a screw-thread 18, onto which is screwed a nut 19 in such manner that when the nut is tightened the tubular steel clamping-plate 15 is clamped upon the outer surfaces of the panels 3 and the right-angular surfaces 13 and 14 of the tubular angle-iron 5 are clamped against the inner surfaces of the panels, thereby firmly and rigidly securing these parts in position. The bolt 17 may be a separate part passing through the tubular steel clamping-cap 15 and the tubular angle-iron 5; but, as here shown, the bolt is brazed or otherwise made an integral or permanent part of the cap-plate, so that it becomes, in fact, a stud-bolt to pass through the tubular angle-iron 5 and be secured by the nut 19, as before explained. By this means of clamping the edge portions of all the enameled or ornamental panels in position I avoid the necessity of forming bolt or screw holes in the panels and firmly and securely clamp the latter in position, while at the same time enabling the panels to be readily detached whenever occasion demands—as, for instance, when one panel becomes damaged or injured in any manner and it is desired to substitute a fresh or new panel therefor.

The construction of the triangular tubular angle-irons or brackets 5 and the tubular steel clamping-caps 15, which cover and conceal the joints in the manner described, enables the entire body of the vehicle to be made light in weight, while it will successfully resist all lateral and other pressures and strains to which it may be subjected under ordinary circumstances. The vertical tubular angle-irons, members, or sections are rigidly united at their ends by inserted angular tenons 20, secured in position by rivets 21 or any other fastening or securing means suitable for the purpose in hand.

The substantially right-angular portions 13 and 14 of the tubular angle-irons 5 afford a flat base or support for the panels 3, and the ribs 16 of the tubular steel clamping-caps 15 through the medium of the clamping-bolts 17 firmly clamp the panels upon said tubular angle-irons. If an ornamental panel (one or more) becomes damaged or injured in any manner, it can be readily removed and, if necessary, a new panel substituted therefor. The construction described and shown entirely avoids providing the panels with bolt or screw holes and firmly and securely holds the panels in correct position with relation to the entire frame composing the body of the vehicle.

All parts of the skeleton frame of the body of the vehicle are provided with decorated or ornamental panels of the character before referred to, and these panels are secured in position at all required points through the medium of the tubular angle-irons, tubular steel clamping-caps, and clamping-bolts hereinbefore described.

Having thus described my invention, what I claim as new, and desire to secure by Letters Patent, is—

1. A frame for a vehicle-body made up of tubular, vertical bars, longitudinal bars and cross-bars having plane surfaces for the attachment of panels, and corner-pieces having tenons thereon adapted to fit within said tubular bars.

2. The combination with a bar constituting a portion of the frame of a vehicle-body having plane surfaces, and panels lying against said plane surfaces, of a clamping-cap consisting of a tubular bar bent to form inwardly-projecting beads, the said beads being adapted to engage the outer surfaces of two adjacent panels, and means for securing said clamping-cap to said bar and holding said panels in contact therewith.

3. The combination with an angle-bar constituting a portion of the frame of a vehicle-body, the said angle-bar having plane side walls, and panels lying against said plane walls, of a clamping-cap consisting of a tubular bar bent to form angularly-arranged outer walls, and inwardly-projecting beads at the ends of said angular walls, the said beads being adapted to engage the outer surfaces of two adjacent panels, and means for securing said clamping-cap to the said angle-bar and holding said panels in contact therewith.

4. The combination with a tubular angle-bar constituting a portion of the frame of a vehicle-body, the said angle-bar having plane side walls and a concave inner wall and having openings extending through the concave wall and through the corner between said plane walls, and panels lying against said plane walls, of a clamping-cap consisting of a tubular bar bent to form angularly-arranged outer walls and inwardly-projecting beads at the ends of said angular walls, the said beads being adapted to engage the outer surfaces of two adjacent panels, and a bolt secured to said clamping-cap extending through the openings in said angle-bar for securing said cap to said angle-bar and holding said panels in contact therewith.

In testimony whereof I have hereunto set my hand in presence of two subscribing witnesses.

HARRY McLAUGHLIN.

Witnesses:
Wm. M. Stockbridge,
Geo. W. Rea.